United States Patent Office 3,799,973
Patented Mar. 26, 1974

3,799,973
1-(PHENOXY)-3-ALKYLAMINO-2-PROPANOLS
AND THE SALTS THEREOF
Leslie Harold Smith, Alderley Park,
Macclesfield, Cheshire, England
No Drawing. Filed Jan. 24, 1972, Ser. No. 220,377
Int. Cl. C07c 93/06
U.S. Cl. 260—501.17                              10 Claims

ABSTRACT OF THE DISCLOSURE

New 1 - (hydroxyalkoxy)phenoxy-3-amino-2-propanol derivatives, processes for their manufacture, pharmaceutical compositions containing them and a method for using them in treatment of heart disease. The compounds possess β-adrenergic blocking activity. Representative of the compounds disclosed is 1-(2-β-hydroxyethoxyphenoxy)-3-t-butylamino-2-propanol.

---

This invention relates to new alkanolamine derivatives which possess β-adrenergic blocking activity.

According to the invention there is provided a new alkanolamine derivative of the formula:

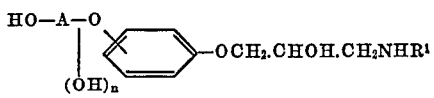

wherein R$^1$ stands for hydrogen, or for an alkyl or hydroxyalkyl radical each of up to 6 carbon atoms, or for a cycloalkyl radical of up to 8 carbon atoms, wherein A stands for an alkylene radical of from 2 to 6 carbon atoms and wherein $n$ stands for the integer 0 or 1; or an acid-addition salt thereof.

It is to be understood that the alkanolamine derivative of the invention possesses at least one asymmetric carbon atom, namely the carbon atom of the —CHOH— group in the alkanolamine side-chain, and it may therefore the resolved into optically-active enantiomorphic forms. At least one, and possibly both, of these enantiomorphic forms will possess β-adrenergic blocking activity. It is to be understood, therefore, that this invention encompasses the racemic form of the alkanolamine derivative and any enantiomorphic form thereof which possesses β-adrenergic blocking activity. It is to be understood that β-adrenergic blocking activity usually predominates in that enantiomorphic form which has the "S" absolute configuration of the said —CHOH— group.

A suitable value for R$^1$ when it stands for an alkyl or hydroxyalkyl radical is, for example, the ethyl, n-propyl, isopropyl, n-butyl, s-butyl, t-butyl, 2-hydroxy-1-methylethyl or 2-hydroxy-1,1-dimethylethyl radical. Preferably the alkyl or hydroxyalkyl radical R$^1$ contains 3 or 4 carbon atoms and is branched at the α-carbon atom.

A suitable value for R$^1$ when it stands for a cycloalkyl radical is, for example, the cyclopropyl, cyclobutyl, cyclopentyl or cyclohexyl radical.

A suitable value for A is, for example, the ethylene, trimethylene or 1-methyethylene radical. It is to be understood that when $n$ stands for the integer 1, the second hydroxy radical is not attached to a carbon atom of the alkylene radical A to which an oxygen atom is already attached.

A suitable acid-addition salt of the alkanolamine derivative of the invention is for example, a salt derived from an inorganic acid, for example a hydrochloride, hydrobromide, phosphate or sulphate, or a salt derived from any organic acid, for example an oxalate, lactate, tartrate, acetate, salicylate, citrate, benzoate, β-naphthoate, adipate or 1,1 - methylene-bis-(2-hydroxy-3-naphthoate), or a salt derived from an acidic synthetic resin, for example a sulphonated polystyrene resin, for example "Zeo-Karb" 225 ("Zeo-Karb" is a trademark).

A specific alkanolamine derivative of the invention is, for example, 1-(2-β-hydroxyethoxyphenoxy)-3-isopropylamino-, 3-t-butylamino-, 3-cyclopentylamino- or 3-(2-hydroxy-1,1-dimethyl-ethylamino)-2-propanol; 1-(2- or 4-γ-hydroxypropoxyphenoxy) - 3 - isopropylamino-2-propanol or 1-[2- or 4-(2,3-dihydroxypropoxy)-phenoxy]-3-isopropylamino-2-propanol or an acid-addition salt theerof.

The alkanolamine derivative of the invention may be manufactured by any chemical process known to be useful for the manufacture of chemically-analogous compounds.

According to a further feature of the invention, there fore, there is provided a process for the manufacture of the alkanolamine derivative of the invention which comprises assembling in sequence, by chemical synthesis, the five radicals:

(i) a hydroxylated alkyl radical of the formula:

$$R^2O-A-$$
$$(OR^3)_n$$

wherein R$^2$ and R$^3$, which may be the same or different, stand for hydrogen or for protecting groups and wherein A and $n$ have the meanings stated above;

(ii) an oxygenated phenoxy radical of the formula:

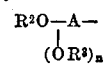

(iii) an oxygenated three-carbon radical of the formula:

wherein R$^4$ stands for hydrogen or for a protecting group;

(iv) an imino radical of the formula —NR$^5$—, wherein R$^5$ stands for hydrogen or for a protecting group; and (v) a radical of the formula —R$^1$, wherein R$^1$ has the meaning stated above;

whereafter if one or more of R$^2$, R$^3$, R$^4$ and R$^5$ stands for a protecting group, the one or more protecting groups are removed.

The various stages of the assembly may be carried out in any possible order. Thus, for example:

(a) a hydroxyalkoxyphenol of the formula:

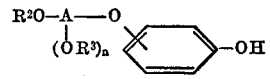

wherein R$^2$, R$^3$, A and $n$ have the meanings stated above, may first be reacted with an oxygenated three-carbon derivative, for example a compound of the formula:

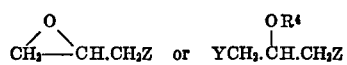

wherein R$^4$ has the meaning stated above and wherein Y and Z, which may be the same or different, stand for displaceable radicals. The resulting product, which is a compound of the formula:

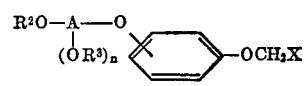

wherein $R^2$, $R^3$, A and $n$ have the meanings stated above wherein X stands for the group

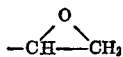

or the group

wherein $R^4$ and Y have the meanings stated above, or which is, when $R^4$ stands for hydrogen, a mixture of such compounds wherein X has both meanings stated above, is then reacted with an amine of the formula $R^1R^5NH$, wherein $R^1$ and $R^5$ have the meanings stated above, or with a precursor of such an amine.

(b) An oxygenated three-carbon derivative, for example a compound of the formula:

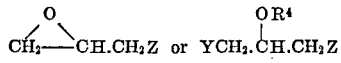

wherein $R^4$, Y and Z have the meanings stated above, is reacted with an amine of the formula $R^1R^5NH$, wherein $R^1$ and $R^5$ have the meanings stated above, or with a precursor of such an amine. The resulting product, which is a compound of the formula $XCH_2 \cdot NR^1R^5$, wherein $R^1$, $R^5$ and X have the meanings stated above, or which is, when $R^4$ stands for hydrogen, a mixture of such compounds wherein X has both meanings stated above, is then reacted with a hydroxyalkoxyphenol of the formula:

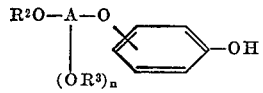

wherein $R^2$, $R^3$, A and $n$ have the meanings stated above.

A suitable value for the displaceable radical Y or Z is, for example, a halogen atom, for example, the chlorine or bromine atom, or a sulphonyloxy radical, for example an alkanesulphonyloxy radical of up to 6 carbon atoms or an arenesulphonyloxy radical of up to 10 carbon atoms, for example the methanesulphonyloxy, benzenesulphonyloxy or toluene-p-sulphonyloxy radical.

The reaction involving a phenol reactant may be carried out in the presence of an acid-binding agent, for example an alkali metal hydroxide, for example sodium hydroxide, or an organic base, for example piperidine. Alternatively, an alkali metal derivative of the phenol reactant, for example the sodium or potassium derivative, may be used as starting material. The reaction may be carried out in a diluent or solvent, for example methanol or ethanol, and it may be accelerated or completed by the application of heat, for example by heating to the boiling point of the diluent or solvent.

The reaction involving an amine of the formula $R^1R^5NH$ may be carried out at ambient temperature or it may be accelerated or completed by the application of heat, for example by heating to a temperature of 90–110° C.; it may be carried out at atmospheric or at an elevated pressure, for example by heating in a sealed vessel; and it may be carried out in an inert diluent or solvent, for example methanol or ethanol, or an excess of the amine of the formula $R^1R^5NH$, wherein $R^1$ and $R^5$ have the meanings stated above, may be used as a diluent or solvent.

A suitable precursor of the amine of the formula $R^1R^5NH$ is, for example, a urea of the formula $$R^1R^5N \cdot CO \cdot NR^1R^5$$

wherein $R^1$ and $R^5$ have the meanings stated above. The reaction involving a urea may be carried out in a high boiling diluent or solvent, for example Tetralin, Decalin or benzonitrile, and it may be carried out at a temperature of between 150 and 220° C.

(c) The series of reactions described under (a) or (b) above may be carried out except that a hydroxyphenol is used in place of the hydroxyalkoxyphenol. The resulting product, which is a phenolic compound of the formula:

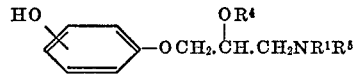

wherein $R^1$, $R^4$ and $R^5$ have the meanings stated above, is then reacted with a compound of the formula:

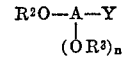

wherein $R^2$, $R^3$, A $n$ and Y have the meanings stated above.

The last-mentioned reaction may be carried out in the presence of an acid-binding agent. Alternatively, a metal salt of the phenolic compound, for example an alkali metal salt, for example the sodium salt, or the thallium salt may be used. The reaction may be carried out in a diluent or solvent, for example ethanol or dimethylformamide, and it may be accelerated or completed by the application of heat, for example by heating to a temperature of up to 150° C.

(d) The series of reactions described under (a) or (b) or (c) above may be carried out except that an amine of the formula $R^5NH_2$ is used in place of an amine of the formula $R^1R^5NH$, it being understood that when $R^5$ stands for hydrogen the amine is ammonia. The radical $R^1$ may then be inserted as a separate step, for example either by the reaction of the final product from the series of reactions described under (a) or (b) or (c) above with a compound of the formula $R^1Y$, wherein $R^1$ and Y have the meanings stated above, or, when $R^5$ stands for hydrogen, by the reaction under reducing conditions of the final product from the series of reactions described under (a) or (b) or (c) above with a carbonyl compound of the formula $R^6 \cdot CO \cdot R^7$ wherein $R^6$ stands for an alkyl radical and $R^7$ stands for an alkyl or hydroxy alkyl radical, or wherein $R^6$ and $R^7$ are joined together with the adjacent carbon atom to form a cycloalkyl radical, such that the radical —$CHR^6R^7$ has the same meaning as is stated above for $R^1$.

A particularly suitable compound of the formula $R^1Y$ is isopropyl bromide. The reaction involving a compound of the formula $R^1Y$ may conveniently be carried out in the presence of a base, for example sodium or potassium carbonate, in a diluent or solvent, for example ethanol or isopropanol, at an elevated temperature, for example at the boiling point of the diluent or solvent.

Suitable reducing conditions for the reaction involving the carbonyl compound are those provided by the presence of hydrogen and a hydrogenation catalyst, for example palladium or platinum, in an inert diluent or solvent, for example in one or more solvents selected from water, ethanol and an excess of the carbonyl compound used as starting material; or by the presence of an alkali metal borohydride, for example sodium borohydride or lithium cyanoborohydride, in an inert diluent or solvent, for example in one or more solvents selected from water, ethanol, methanol and an excess of the carbonyl compound used as starting material.

(e) A compound wherein one or more of $R^2$, $R^3$, $R^4$ and $R^5$ stands for a protecting group may be prepared by the series of reactions described under (a) or (b) or (c) or (d) above. Alternatively, a suitable protecting group may be introduced by conventional means into an intermediate compound at any stage preceding the final stage.

A suitable value for $R^2$, $R^3$ or $R^4$ when it stands for a protecting group is, for example, a hydrogenolyzable radical, for example an α-arylalkyl, α-arylalkoxy-carbonyl or α-arylalkoxymethyl radical, for example the benzyl, benzyloxycarbonyl or benzyloxymethyl radical, or an acyl radical, for example an alkanoyl radical of up to 20 carbon atoms or an aroyl radical of up to 10 carbon atoms, or an α-alkoxyalkyl radical (that is, a radical which forms with the oxygented three-carbon radical an acetal radical), for example the tetrahydropyranyl radical.

A suitable value for $R^5$ when it stands for a protecting group is, for example, a hydrogenolyzable or acyl radical as defined for $R^2$, or a carbamoyl radical, for example a radical of the formula —$CONHR^1$, wherein $R^1$ has the meaning stated above.

Alternatively, $R^4$ and $R^5$ may be joined together so that one protecting group serves to protect both the oxygen and nitrogen atom. Such a protecting group may be, for example, the carbonyl (—CO—) radical, such that it forms, together with the adjacent oxygen and nitrogen atoms and two carbon atoms of the three-carbon radical, an oxazolidinone nucleus, or it may be a radical of the formula —$CHR^8$—, wherein $R^8$ stands for hydrogen, or for an alkyl radical of up to 6 carbon atoms, or for an aryl radical, for example the phenyl radical, such that it forms, together with the adjacent oxygen and nitrogen atoms and two carbon atoms of the three-carbon radical, an oxazolidine nucleus.

The hydrogenolyzable protecting group $R^2$, $R^3$, $R^4$ or $R^5$ may be removed for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrochloric or oxalic acid.

The acyl protecting group $R^2$, $R^3$, $R^4$ or $R^5$, or the carbamoyl protecting group $R^5$, or the carbonyl protecting group formed by $R^4$ and $R^5$ taken together, may be removed by hydrolysis in the presence of a base, for example an alkali metal hydroxide, in a diluent or solvent, for example water, methanol, ethanol or a mixture thereof.

The α-alkoxyalkyl protecting group $R^2$, $R^3$, $R^4$ or $R^5$, or the protecting group $R^8CH$— formed by $R^4$ and $R^5$ taken together, may be removed by hydrolysis in the presence of an acid, for example a mineral acid, for example aqueous hydrochloric acid, and the hydrolysis may be carried out at a temperature of up to 100° C.

A preferred process for the manufacture of the alkanolamine derivative of the invention comprises the reaction of a compound of the formula:

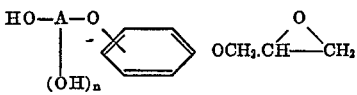

or

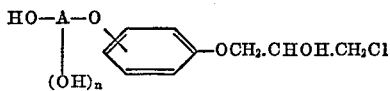

wherein A and $n$ have the meanings stated above (both of which compounds may be obtained by the reaction of the corresponding phenol with epichlorohydrin), with an amine of the formula $R^1NH_2$, wherein $R^1$ has the meaning stated above.

Optically-active enantiomorphs of the alkanolamine derivative of the invention may be obtained by the resolution of the corresponding racemic alkanolamine derivative of the invention by conventional means.

The said resolution may be carried out by reacting the racemic alkanolamine derivative with an optically-active acid, followed by fractional crystallization of the diastereoisomeric mixture of salts thus obtained, from a diluent or solvent, for example ethanol, whereafter the optically-active alkanolamine derivative is liberated from the salt by treatment with a base. A suitable optically-active acid is, for example (+)- or (−)-O,O-di-p-toluoyltartaric acid.

The resolution process may be facilitated by treating the partially resolved alkanolamine derivative in free base form obtained after a single fractional crystallization of the diastereoisomeric mixture of salts with a solubilizing agent, for example a primary amine, for example allylamine, in a relatively nonpolar diluent or solvent, for example petroleum ether.

The alkanolamine derivatives of the invention in freebase form may be converted into an acid-addition salt thereof by reaction with an acid by conventional means.

As stated above, the alkanolamine derivative of the invention possesses β-adrenergic blocking activity. This activity may be determined by the reversal of isoprenaline-induced tachycardia in rats or cats, a standard test for the determination of β-adrenergic blocking activity. Depending upon the values for $R^1$, A and $n$, the β-adrenergic blocking activity of a compound of the invention lies between slightly greater than that of propranolol and one-fifth that of propranolol. At doses of a compound of the invention producing effective β-adrenergic blockade in rats or cats, no symptoms of toxicity are apparent.

The alkanolamine derivative of the invention may be administered to warm-blooded animals, including man, in the form of a pharmaceutical composition comprising as active ingredient at least one alkanolamine derivative of the invention of an acid-addition salt thereof, in association with a pharmaceutically-acceptable diluent or carrier therefor.

A suitable composition is, for example, a tablet, capsule, aqueous or oily solution or suspension, emulsion, injectable aqueous or oily solution or suspension, dispersible powder, spray or aerosol formulation.

The pharmaceutical composition may contain, in addition to the alkanolamine derivative of the invention, one or more drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; cardiotonic agents, for example digitalis preparations; and sympathomimetic bronchodilators, for example isoprenaline, orciprenaline, adrenaline and ephedrine.

When used for the treatment of heart diseases, such as angina pectoris and cardiac arrhythmias, or for the treatment of hypertension, in man it is expected that the alkanolamine derivative would be given to man at a total oral dose of between 20 mg. and 600 mg. daily, at doses spaced at 6–8 hourly intervals, or at an intravenous dose of between 1 mg. and 20 mg. Preferred oral dosage forms are tablets or capsules containing between 10 and 100 mg., and preferably 10 mg. or 40 mg. of active ingredient. Preferred intravenous dosage forms are sterile aqueous solutions of the alkanolamine derivative or of a non-toxic acid-addition salt thereof, containing between 0.05% and 1% w./v. of active ingredient, and more particularly containing 0.1% w./v. of active ingredient.

The invention is illustrated but not limited by the following examples:

EXAMPLE 1

A mixture of 6 g. of 1-(2-β-hydroxyethoxyphenoxy)-2,3-epoxypropane, 25 ml. of isopropylamine and 25 ml. of n-propanol is heated under reflux for 8 hours and is then evaporated to dryness under reduced pressure. The residue is dissolved in 25 ml .of aqueous 2N-hydrochloric acid, the solution is treated with carbon and filtered and the filtrate is made alkaline. The aqueous supernatant layer is decanted off, the residue is dissolved in 25 ml. of ethyl acetate, and the solution is dried over anhydrous magnesium sulphate. The mixture is filtered and an excess of ethereal hydrogen chloride solution is added to the filtrate. The mixture is filtered and the solid residue is crystallized from a mixture of isopropanol and ethyl acetate. There is thus obtained 1-(2-β-hydroxyethoxyphenoxy)-3-isopropylamino-2-propanol hydrochloride hydrate, M.P. 88–90° C.

The 1-(2-β-hydroxyethoxyphenoxy)-2,3-epoxypropane used as starting material may be obtained as follows:

A mixture of 4.5 g. of 2-β-hydroxyethoxyphenol, 2.4 g. of sodium hydroxide, 50 ml. of water and 7.2 ml. of epichlorohydrin is stirred at room temperature for 18 hours. The mixture is extracted with 25 ml. of chloroform and the chloroform layer is separated and dried over anhydrous magnesium sulphate. The mixture is filtered and filtrate is evaporated to dryness under reduced pressure. The residue consists of 1-(2-β-hydroxyethoxyphenoxy)-2,3-epoxypropane and is used without further purification.

EXAMPLE 2

A mixture of 10 g. of 1-(2-γ-hydroxypropoxyphenoxy)-2,3-epoxypropane and 25 ml. of isopropylamine is kept at room temperature for 64 hours. The mixture is evaporated to dryness under reduced pressure and the residue is dissolved in 25 ml. of aqueous 2N-hydrochloric acid. The mixture is carbon treated and filtered and the filtrate is basified with aqueous 11N-sodium hydroxide solution. The aqueous supernatant layer is decanted off, the residue is dissolved in 50 ml. of ethyl acetate and the solution is dried over anhydrous magnesium sulphate. The mixture is filtered and the filtrate is evaporated to dryness under reduced pressure. The residue is dissolved in 50 ml. of acetone and the solution is added to a solution of 7.8 g. of oxalic acid in 50 ml. of acetone. The mixture is filtered and the solid residue is crystallized from isopropanol. There is thus obtained 1-(2-γ-hydroxypropoxyphenoxy)-3-isopropylamino-2-propanol oxalate, M.P. 124–126° C. (with decomposition).

The 1-(2-γ-hydroxypropoxyphenoxy)-2,3-epoxypropane used as starting material may be obtained as follows:

A mixture of 9.3 g. of 2-γ-hydroxypropoxyphenol, 300 ml. of water, 4.8 g. of sodium hydroxide and 14.4 ml. of epichlorohydrin is stirred at room temperature for 5 hours. The mixture is extracted twice with 50 ml. of chloroform each time and the combined chloroform extracts are dried over anhydrous magnesium sulphate. The mixture is filtered and the filtrate is evaporated to dryness under reduced pressure. The residue consists of 1-(2-γ-hydroxypropoxyphenoxy)-2,3-epoxypropane and is used without further purification.

EXAMPLE 3

A mixture of 4 g. of 1-(2-β-hydroxyethoxyphenoxy)-2,3-epoxypropane, 20 ml. of cyclopentylamine and 25 ml. of n-propanol is heated under reflux for 18 hours and is then evaporated to dryness under reduced pressure. The residue is stirred with 50 ml. of aqueous 2N-hydrochloric acid and the mixture is extracted twice with 50 ml. of ether each time. The aqueous acidic phase is basified with aqueous 18N-sodium hydroxide solution and extracted twice with 50 ml. of ethyl acetate each time. The combined ethyl acetate extracts are dried over anhydrous magnesium sulphate and evaporated to dryness under reduced pressure. The residue is subjected to thick-layer chromatography on a 2 mm. x 20 cm. x 40 cm. plate of silica gel (Merck, Kieselgel PF$_{254}$ gipshaltig) using a 1:99 v./v. mixture of ammonium hydroxide (specific gravity 0.89) and methanol as eluting solvent. The material with an $R_F$ value of 0.5 is extracted with methanol and the methanol extract is evaporated to dryness. There is thus obtained as oily residue 3-cyclopentylamino-1-(2-β-hydroxyethoxyphenoxy)-2-propanol.

EXAMPLE 4

The process described in Example 3 is repeated except that the appropriate 2,3-epoxy-1-(hydroxyalkoxyphenoxy)propane and the appropriate amine are used as starting materials. There are thus obtained the compounds described in the following table:

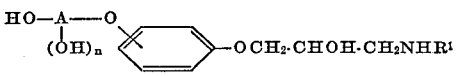

| $R^1$ | HO—A—O— OH group | Position in benzene ring | $R_F$ value |
|---|---|---|---|
| t-Butyl | β-hydroxyethoxy | o- | 0.5 |
| 2-hydroxy-1,1-dimethylethyl | do | o- | 0.5 |
| Isopropyl | 2,3-dihydroxypropoxy | o- | 0.65 |
| Do | do | p- | 0.65 |

EXAMPLE 5

A mixture of 3 g. of 3-chloro-1-(4-γ-hydroxypropoxyphenoxy)-2-propanol, 30 ml. of isopropylamine and 30 ml. of n-propanol is heated under reflux for 18 hours and is then evaporated to dryness under reduced pressure. The residue is dissolved in 25 ml. of aqueous 2N-hydrochloric acid and the solution is extracted twice with 25 ml. of ether each time. The aqueous acidic phase is basified with aqueous 18N-sodium hydroxide solution and extracted twice with 50 ml. of ethyl acetate each time. The combined ethyl acetate extracts are dried over anhydrous magnesium sulphate and evaporated to dryness under reduced pressure. The residue is subjected to thick-layer chromatography as described in Example 3 and the material with an $R_F$ value of 0.6 is extracted with methanol. The methanol extract is evaporated to dryness and there is thus obtained as oily residue 1-(4-γ-hydroxypropoxyphenoxy)-3-isopropylamino-2-propanol.

The 3-chloro-1-(4-γ-hydroxypropoxyphenoxy)-2-propanol used as starting material may be obtained as follows:

A mixture of 3 g. of 4-γ-hydroxypropoxyphenol, 30 ml. of epichlorohydrin and 0.25 ml. of piperidine is heated at 90° C. for 18 hours and the mixture is evaporated to dryness under reduced pressure. The residue consists of 3-chloro-1-(4-γ-hydroxypropoxyphenoxy)-2-propanol and is used without further purification.

What is claimed is:

1. An alkanolamine derivative selected from compounds of the formula:

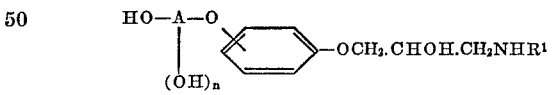

wherein $R^1$ is alkyl or hydroxyalkyl each of 3 to 4 carbon atoms or cyclopentyl wherein A is ethylene or trimethylene and wherein $n$ is the integer 0 or 1, and the acid-addition salts thereof.

2. A compound selected from 1-(2-β-hydroxyethoxyphenoxy)-3-isopropylamino-2-propanol.

3. An acid-addition salt as claimed in claim 1 which is a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate).

4. A compound selected from 1-(2-γ-hydroxypropoxyphenoxy)-3-isopropylamino-2-propanol, and the acid addition salts thereof.

5. A compound selected from 1-(2-β-hydroxyethoxyphenoxy)-3-t-butylamino-2-propanol, and the acid addition salts thereof.

6. A compound selected from 1-(2-β-hydroxyethoxyphenoxy)-3-cyclopentylamino-2-propanol, and the acid addition salts thereof.

7. A compound selected from 1-(2-β-hydroxyethoxyphenoxy) - 3 - (2-hydroxy-1,1-dimethyl-ethylamino)-2-propanol, and the acid addition salts thereof.

8. A compound selected from 1-(4-γ-hydroxypropoxyphenoxy)-3-isopropylamino-2-propanol, and the acid addition salts thereof.

9. A compound selected from 1-[2-(2,3-dihydroxypropoxy)phenoxy]-3-isopropylamino-2-propanol, and the acid addition salts thereof.

10. A compound selected from 1-[4-(2,3-dihydroxypropoxy)phenoxy]-3-isopropylamino-2-propanol, and the acid addition salts thereof.

References Cited

UNITED STATES PATENTS

| 3,674,840 | 7/1972 | Elof et al. | 260—501.17 |
|---|---|---|---|
| 3,639,634 | 2/1972 | Marshall | 260—570.7 X |
| 3,663,607 | 5/1972 | Barrett et al. | 260—570.7 X |

ROBERT V. HINES, Primary Examiner

U.S. Cl. X.R.

260—348 R, 348.6, 501.19, 570.7, 613 D; 424—330

UNITED STATES PATENT OFFICE
CERTIFICATE OF CORRECTION

Patent No. 3,799,973          Dated March 26, 1974

Inventor(s) Leslie Harold Smith

It is certified that error appears in the above-identified patent and that said Letters Patent are hereby corrected as shown below:

IN THE HEADING

After the paragraph designating the name and address of the inventor, please insert the following paragraphs:

-- Assignee: Imperial Chemical Industries Limited,
        London, England

FOREIGN APPLICATION PRIORITY DATA

February 9, 1971       Great Britain..........4258/71 --

IN THE CLAIMS

Claim 2, line 2, the phrase --and the acid-addition salts thereof-- should be inserted before the period.

Signed and sealed this 17th day of September 1974.

(SEAL)
Attest:

McCOY M. GIBSON JR.          C. MARSHALL DANN
Attesting Officer            Commissioner of Patents